No. 844,820. PATENTED FEB. 19, 1907.
A. H. MARKS.
METHOD OF FORMING PNEUMATIC TIRES OR TIRE CASINGS.
APPLICATION FILED NOV. 19, 1906.

UNITED STATES PATENT OFFICE.

ARTHUR HUDSON MARKS, OF AKRON, OHIO.

METHOD OF FORMING PNEUMATIC TIRES OR TIRE-CASINGS.

No. 844,820.            Specification of Letters Patent.            Patented Feb. 19, 1907.

Application filed November 19, 1906. Serial No. 344,140.

*To all whom it may concern:*

Be it known that I, ARTHUR HUDSON MARKS, a citizen of the United States, residing at Akron, in the county of Summit and State of Ohio, have invented certain new and useful Improvements in Methods of Forming Pneumatic Tires or Tire-Casings, of which the following is a specification.

This invention relates to an improved method for forming pneumatic tires or tire-casings, the object being to provide a method for constructing tires or sheaths by the exercise of which the difficulty of insuring the proper disposition of the material experience in following the method of construction now practised will be obviated, thereby producing a strong and durable tire or casing.

Figure 1:
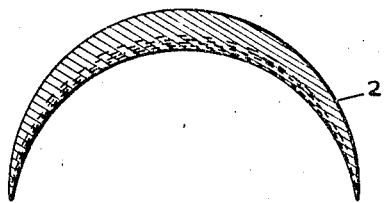
Figure 2:
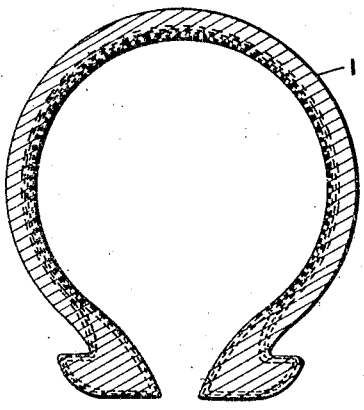
Figure 3:
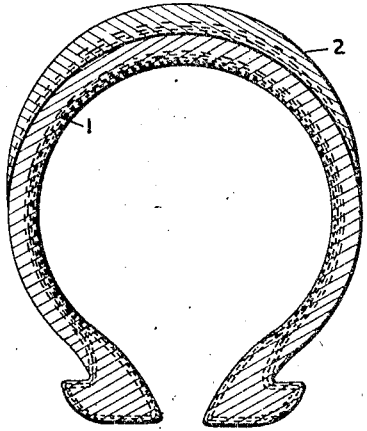

In the drawings, Figure 1 is a transverse sectional view taken through the tread portion as constructed in following out my invention; Fig. 2, a similar view taken through the body portion, and Fig. 3 a transverse sectional view of the completed tire-sheath.

In the drawings, I have illustrated a tire-casing embodying my invention; but it is not so limited.

Tires or tire-sheaths are constructed with relatively thin side walls and thick tread portions, and the general method of forming such a sheath or tire consists in building up the same, including the tread, in a single piece. This method produces satisfactory results in small tires—as, for instance, bicycle-tires—where the amount of material is small and the layers of fabric few; but in a larger tire after the tire or sheath has been formed and placed in a mold the thickened rubber compound forming the tread is frequently partially pushed out of position and forced along the side walls, thereby weakening the tread and adding material at points where it is not needed. This method has the further effect of sometimes causing one or more of the layers of fabric to wrinkle or crease, thus reducing the resisting power of the tire to bursting pressure, for the reason that the layers of fabric thus receive the pressure individually instead of collectively.

In the manufacture of a tire-sheath in accordance with my invention I build the body portion 1 and the tread portion 2 on a mandrel in the usual manner. The body portion is semivulcanized, and its outer surface is then thoroughly roughened and coated with a rubber cement. The tread is then placed in proper position upon the body portion and the whole tightly wrapped in wet cloths and hung in hot steam for the purpose of completing its vulcanization, thus dispensing with the use of a mold. The rubber compound used in the construction of the body portion is so prepared as to require twice as long to vulcanize as the compound used for the tread portion, so that the time necessary to complete the vulcanization of the body portion will be sufficient to completely vulcanize the tread and the rubber cement. However, the same compound can be used for both the tread and body portion, and these two parts each semivulcanized before being united, the vulcanization being thereafter completed.

I do not claim in the present application the tire or sheath produced by the exercise of my improved method, as this forms the subject-matter of an application filed November 19, 1906, Serial No. 344,141.

Having thus fully described my invention, what I claim as new, and desire to secure by Letters Patent of the United States, is—

1. The improved process of manufacturing pneumatic tires or tire-casings consisting in forming and partly vulcanizing the body, applying an adhesive element to the outer surface thereof, then applying an unvulcanized tread portion so formed as to be vulcanized in the time required to complete the vulcanization of the body portion and finally vulcanizing the whole structure.

2. The improved method of manufacturing tires or tire-casings consisting in forming the body of the tire and partly vulcanizing the same, then applying an adhesive element to the outer surface of the body portion then applying thereto a partially-vulcanized tread portion and finally completing the vulcanization of the structure.

In testimony whereof I affix my signature in presence of two witnesses.

ARTHUR HUDSON MARKS.

Witnesses:
   MICHAEL A. FLYNN,
   HARLEY J. MOTZ.